March 2, 1937.　　　S. P. F. SNEED　　　2,072,387
SAFETY CORDAGE
Filed Dec. 27, 1933　　　3 Sheets-Sheet 1
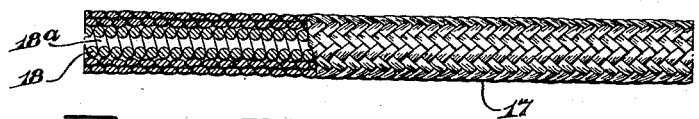
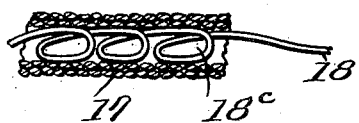
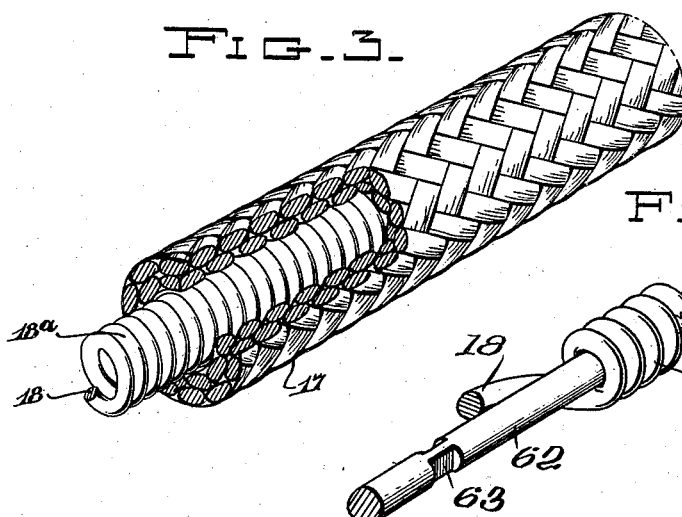
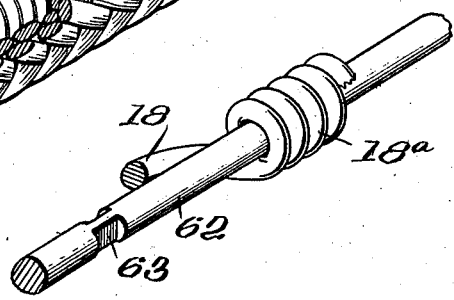
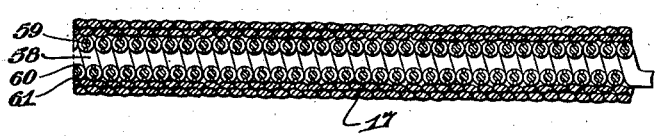
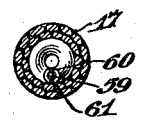
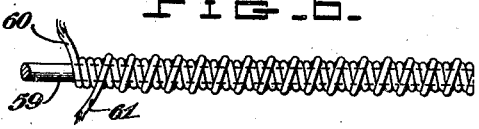
INVENTOR:
Stephen P. F. Sneed,
BY Sturtevant, Mason & Porter
ATTORNEYS March 2, 1937. S. P. F. SNEED 2,072,387
SAFETY CORDAGE
Filed Dec. 27, 1933 3 Sheets-Sheet 2
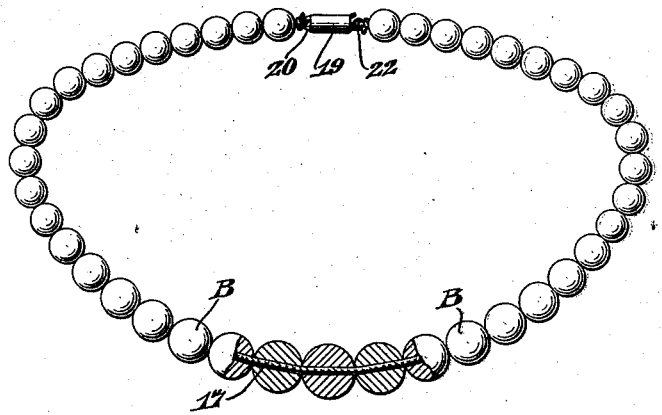
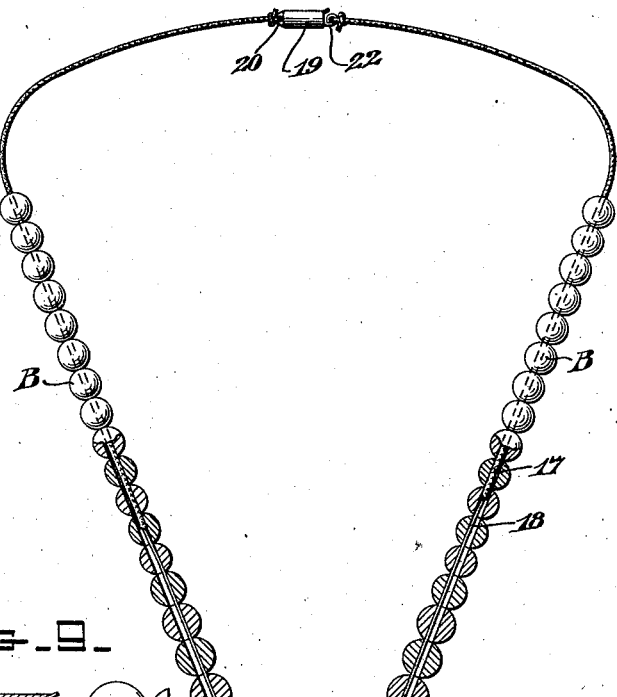
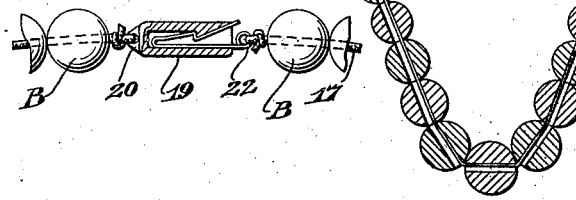
INVENTOR:
Stephen P. F. Sneed,
BY Sturtevant, Mason & Porter
ATTORNEYS March 2, 1937.    S. P. F. SNEED    2,072,387
SAFETY CORDAGE
Filed Dec. 27, 1933    3 Sheets-Sheet 3
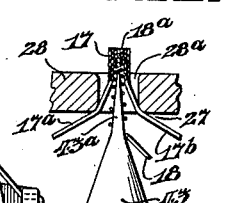
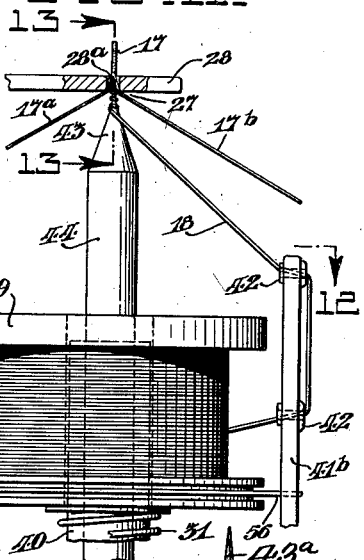
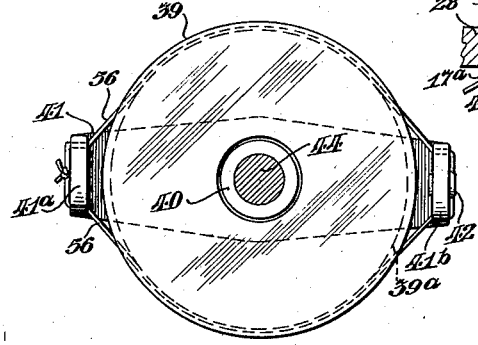
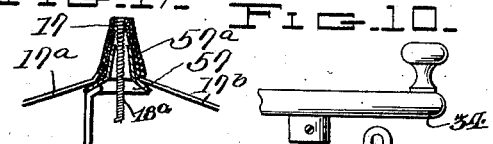
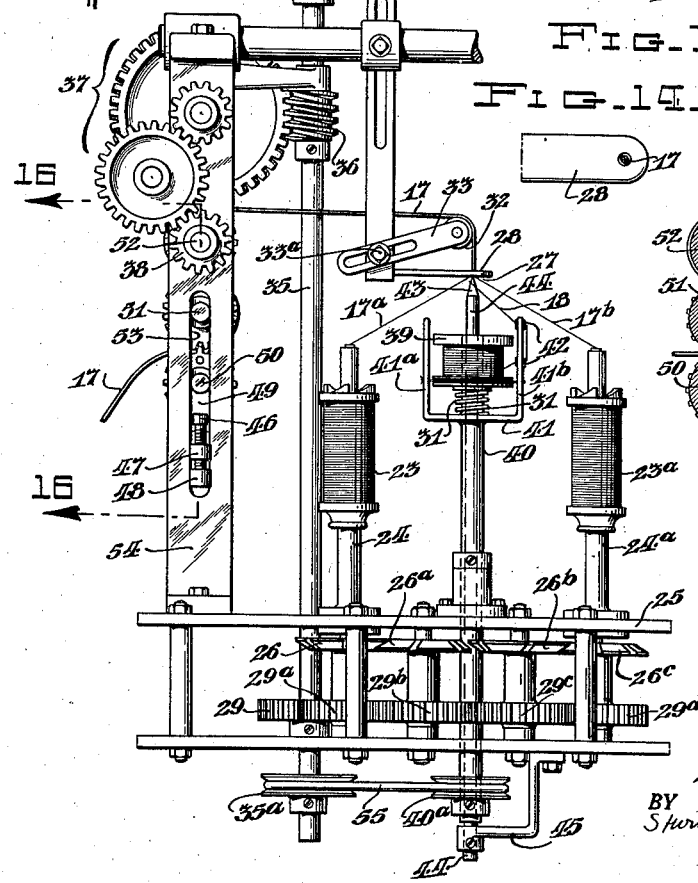
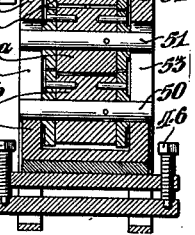
INVENTOR:
Stephen P. F. Sneed,
BY Sturtevant, Mason + Porter
ATTORNEYS Patented Mar. 2, 1937

2,072,387

UNITED STATES PATENT OFFICE 2,072,387

SAFETY CORDAGE

Stephen P. F. Sneed, Atlanta, Ga.

Application December 27, 1933, Serial No. 704,190

15 Claims. (Cl. 96—26)

The present invention relates to improvements in cordage, and more particularly to improved safety cordage and to improved methods of making the same.

Cordage, made in accordance with the present invention, may be used for numerous purposes and the size of the cordage may be varied at will, depending, of course, upon the particular use to which it is to be directed.

Large quantities of cord are used for stringing beads, jewels and other ornaments commonly worn in the form of necklaces. Because of the fact that these ornaments are usually made of hard abrasive substances, and also because they often possess sharp edges, the bead cord is subjected to severe wear from the constant rubbing of the ornaments thereon and from the possible cutting of the cord by the sharp edges of the ornaments. Such wear often causes the breaking of the cord and, as a result of such breaking, the ornaments fall from the cord and scatter. The possible loss of valuable ornaments from the breaking of the cord is a peril to be guarded against. Often, in high quality necklaces, the cord is knotted between the beads to prevent the loss of more than one bead if the cord should break. This is, however, an expensive method and furthermore, in matched necklaces, it is an exceedingly difficult matter to replace even one lost bead because of the difficulty in finding a bead of the exact size and quality which may be necessary. The present invention aims to provide a safety bead cord wherein the complete breaking or parting of the cord is effectively prevented whereby to obviate the above-mentioned disadvantages.

Likewise, in well drilling, other subterranean operations and also in subaqueous operations, such as laying cables and the like, heavy tools or other devices are often suspended by ropes or cables and upon the complete breaking or parting of the connections, delay and expense are involved in recovering the suspended devices and in completing the work. A means of maintaining a connection, at all times, between the parted ends of the cable would permit the guiding of gripping tools accurately and quickly to the lower section of the cable to recover the various devices. Similarly, in marine towing and lifeline operations, it is of the utmost importance to maintain the connection between ships and upon the breaking of the connecting line, loss of life and great damage often result. A provision for maintaining a connection between the parts of a line that has parted would permit the rapid drawing into place of another line. Also, in construction work, logging and the like, wire rope, cable, or the like frequently breaks under the great strain and the flying broken ends are exceedingly dangerous to any one who may be in the vicinity. Also, in building construction, where heavy connectors are used, it is of importance to prevent the complete parting of the rope or cable connections. The present invention aims to provide a connecting line or cable which is so constructed that the above mentioned difficulties will be obviated.

It is, of course, obvious that connecting means made in accordance with the present invention may be used for various other purposes and it is to be clearly understood that cordage, within the meaning of the present invention, includes a wide range of connecting means and that the mere size of the cordage is not an essential part of the invention.

The principal object of the present invention is to provide an improved connecting line wherein an outer casing or covering is subjected to the normal loads of use and wherein an extensible core is enclosed within the outer covering, the extensible core being normally inactive and inert but being adapted to maintain a connection upon the breaking of the outer covering.

A further object of the invention is to provide an improved connecting line consisting of an outer covering or casing which is substantially non-extensible and an inner core which is normally free from tensile loads but which is adapted to play out and assume a portion of the tensile loads only upon the breaking of the outer covering or casing.

A still further object of the invention is to provide an improved safety cord, of the type referred to, wherein an outer covering subject to abrasion and tensile loads has enclosed therein an inner safety core which is of greater length than the covering but which is inserted completely and retained within said covering whereby, upon the breaking of the outer covering, the inner core will be free to play out and thus indicate that the covering has parted out and, at the same time, prevent the complete breaking of the entire cord.

The invention still further aims to provide improved safety cordage, of the type referred to, wherein the inner core may be made or inserted in a manner which will cause it to play out with a series of jerks to thus give a distinct warning signal of the breakage of the casing; wherein the inner core will automatically strengthen any weak parts therein as it plays out upon the breaking of the casing; wherein the inner core is prevented from kinking; and wherein the inner core does not resist the bending or flexure of the outer casing.

The invention still further aims to provide improved methods of making safety cordage, of the type herein referred to, whereby the cost of manufacture will remain at a minimum.

These and other objects of the invention will in part be obvious and will be hereinafter more fully pointed out.

In the drawings:

Fig. 1 is a longitudinal view, partly in section, showing the construction of a cord made in accordance with the present invention.

Fig. 2 is a cross-sectional view of the cord shown in Fig. 1.

Fig. 3 is an enlarged perspective view of the cord shown in Fig. 1, with a portion of the outer casing broken away to show the helical inner extensible strand.

Fig. 3a is a longitudinal view, in section, showing a modification of the manner in which the inner core is inserted.

Fig. 3b is a similar view, in section, showing a further modification.

Fig. 4 is a longitudinal view, in section, showing a modified form of the invention.

Fig. 5 is a cross-sectional view of the cord shown in Fig. 4.

Fig. 6 is a detailed view of the extensible core strand of the cord shown in Fig. 4.

Fig. 6a is a detailed view, in perspective, showing a further modified form of inner core.

Fig. 7 is a view showing a necklace or choker of beads strung on a cord made in accordance with the present invention.

Fig. 8 is a view showing the action of the safety cord on rupture of the outer casing and the extensible nature of the inner core.

Fig. 9 is a view showing a clasp and the manner in which the ends of the safety cord are tied thereto.

Fig. 10 is a diagrammatic view of a braiding machine adapted to carry out one method of making the safety cord.

Fig. 11 is a detailed elevation showing the reel which feeds the inner core strand and shows a method of forming and inserting a helical core into the outer covering or casing at the braiding point.

Fig. 12 is a plan view, taken along the line 12—12 of Fig. 11.

Fig. 13 is an enlarged view, taken along line 13—13 of Fig. 11, showing the details of the feeding structure for forming and inserting a helical core into the outer covering or casing.

Fig. 14 is a fragmentary plan view showing a forming plate employed at the braiding point.

Fig. 15 is a diagrammatic view of the take-off pressure rolls employed in the machine shown in Fig. 10.

Fig. 16 is a view of the take-off pressure rolls and the supporting structure therefor, taken substantially along line 16—16 of Fig. 10.

Fig. 17 is a fragmentary view in section, showing another method of forming and inserting the core within the outer covering or casing.

Fig. 18 shows a different form of feeding structure.

Referring more in detail to the accompanying drawings and particularly at this time to Figs. 1 to 3, 3a, 3b, 7, 8 and 9, there is shown, for purposes of illustration, a bead cord which consists of an outer covering or casing 17 and an inner core strand 18 enclosed within the casing. The outer casing 17 is formed of interwoven or braided textile yarns or strands of silk or other suitable material and the beads or jewels B are strung thereon so that it is subject to abrasion and rupture in the manner hereinbefore pointed out. The inner core or strand 18 is formed of any suitable flexible material, such as silk, linen or the like, and is preferably inserted within the casing 17 in the form of a helix 18a, although this is not essential. As shown in Fig. 3a, the core strand 18 may be inserted within the casing 17 in the form of Z-shaped tucks 18b. Similarly, as shown in Fig. 3b, the core strand may be inserted within the casing in the form of loops 18c. Thus, it is apparent that the inner core strand 18 serves as a safety device which will prevent the entire cord from parting even upon the rupture of the outer casing 17, in which event, the inner core strand 18 will play out and elongate but will prevent the beads from scattering. The beads B are shown strung on the cord in the form of a necklace in Fig. 7 and the resulting sag in the necklace after the casing 17 has broken is illustrated in Fig. 8. The ends of the cord are tied to the eyelets 20, 22 of the clasp 19 so that both the casing 17 and the inner core strand 18 are anchored thereto. The sag in the necklace after the casing 17 has broken serves as a convenient way of indicating the breakage to the wearer.

In Figs. 4 to 6 and 6a, there are shown certain modified forms of the inner core for the purpose of giving an idea as to the many ways in which the inner core may be formed. In Figs. 4 to 6, a helical core 58 is inserted within the casing 17. This core, itself, includes a central core strand 59 of rubber or the like. A thread 60 is wound about the rubber core in one direction and an additional thread 61 is wound about the first thread in a reverse direction whereby to aid in preventing kinking of the core 58 as it plays out upon rupture of the casing 17. In Fig. 6a, the core strand 18 is inserted in the casing 17 in the form of a helix 18a, but there is provided a central inner strand 62 which is disposed within the helix 18a. This central strand is provided with a series of weakened portions 63 at predetermined intervals. Thus when the outer casing 17 breaks, the elongation or playing out of the core strand 18 will be resisted to a certain extent by the inner strand 62. This inner strand will break, however, at the weakened points 63 so that, as the core strand 18 plays out, it will do so with a series of jerks, thus giving a vibrating signal that the casing has parted.

A similar series of jerks may be noticed when core strands, as shown in Figs. 3a and 3b, play out. There is a free play out during part of the elongation of the core, but as that part of the strand which is frictionally held against the inner face of the casing is pulled out, there is a distinct retardation of the free play out and so a series of jerks result to give a warning signal. The loops of the core element may be placed or folded in the central area of the outer casing in any arrangement which condenses or shortens the core strand so that it will play out when other elements of the completed cord break. The manner in which the core element is adapted to play out may be varied in the manufacture by changing the arrangement of the loops or folds of the core strand, by varying its length or strength and by various other methods. For example, a relatively short strand may be inserted within the casing by forcing it to expand and shorten or condense as it is fed into the casing; and a regulated resistance during the playing out of the inner core element may be obtained by applying a cementitious ingredient thereto, either throughout its length or at certain intervals.

The inner core element is not subject to abrasion, because the outer casing is usually broken before there is a chance for the inner strand to become worn. The inner core strand is preferably made in the form of helical coils, as shown in Fig. 3, so that any radial pressure, which tends to wear away the casing, will cause the inner helical core to retract into the central area away from such pressure. Hemp rope is manufactured from fibers which are first spun into a yarn, being twisted in a direction called "right handed". Yarns are then twisted into a strand in the opposite direction "left handed". Three or more of these strands are then twisted into a rope in the direction "right handed". The several contrary strains tending to untwist the rope, the strands and the yarns, approximately balance each other and thereby maintain the form of the rope. Thus each yarn and each strand progresses in helical form and completely circles the next larger element and the rope, in one "pitch distance", that is the amount of advance of one complete turn or wrap of a strand. Therefore if an abrasive wears into a rope to the extent of approximately one third of its thickness, from one side only, over a length of one pitch distance, or more, it will have worn half way through every strand. All the yarns, and therefore all the strands, will be cut through and the rope will part. Such an abrasion would not reach the extensible safety core. The so-called strand pitch distance of a three strand rope is only a length of approximately three times the diameter of the rope. Similar conditions apply to braided cordage. If, however, the helical core strand should become weakened, the playing out of the helical core will convert the loops thereof into twists which naturally run to the weakest point in the line so that the weakened porion is thus automatically strengthened as the core strand plays out under tensile strain. A tucked or looped inner core is likewise loosely packed in the casing so that the core tends to retract or move with an abraiding surface.

It is to be clearly understood that a core element, whether of wire or of fibrous material, may be employed with rope, cord and other connecting means of any desired size. If it is desired to prevent kinking of a helical coil of fibrous material, it is only necessary to lay the loops of the helix in a direction opposite to the twist of the strand, whereas in wire cores, it is only necessary to give the wire a partial twist in a sense opposite to the coil as it is being formed.

In marine work, it is often desirable to properly locate an object, and for this purpose the inner core strand may be made of a material capable of floating and made up with a series of contrasting colors so that should the inner strand break, the proper location may be readily ascertained. Similarly, in any case where it is desirable to inspect the cordage, the core may be colored so that a person may readily ascertain the particular type of cordage or the core may be examined to determine whether it has been properly positioned within the casing.

Referring now to Figs. 10 to 18, the machine and methods of forming safety cordage in accordance with the present invention will be described. A braiding machine is illustrated diagrammatically in Fig. 10 and in this machine the braiding yarns 17a, 17b, from which the outer casing 17 is formed, are fed from bobbins 23, 23a, the movements of which are controlled by carriers 24, 24a which travel in race-circles formed, as usual, in the top plate 25 of the machine, the movements of the carriers being controlled by horn gears 26, 26a, 26b, 26c which cause the bobbin holders 24, 24a to travel in the race-circles to interbraid the various yarns 17a, 17b at the braiding point 27 which is determined by a forming plate 28 through which the formed casing 17 passes. The braiding carriers 24, 24a may be of any suitable type, such as that disclosed in the patent to Max Krisslep, No. 1,667,974, issued May 1, 1928. For the sake of simplicity, only two braiding carriers and only two yarns of the casing 17 are shown, but it will be understood that any number of carriers and yarns may be employed, the exact number of which is determined by the size and kind of yarn from which the casing is braided.

The power is applied to the machine in any desired manner, as through a train of intermeshing gears 29, 29a, etc. The completed cord is drawn from the braiding point 27 over a pulley 32, which is carried by a plate 33 adjustably mounted by a screw 33a to the machine frame, by a series of pressure rolls 30, 30a, 30b, which are mounted in the upright side frames 54, and which are diagrammatically shown in Fig. 15. The machine may be turned by a hand wheel 34 mounted on a shaft 35 which carries the gear 29 which is adapted to drive the horn gears 26, 26a, etc. through a train of intermeshing gears. At one end of the shaft 35, there is a pulley 35a which is connected by a belt 55 to a pulley 40a on the shaft 40 whereby the latter shaft is driven. There is a worm gear 36 on the shaft 35 and this worm gear is adapted to drive a train of gears 37 for the purpose of rotating a pinion gear 38 on the shaft 52 of the upper pressure roller 30 whereby to rotate the take-off rolls 30, 30a, 30b.

In order to form the helical coil 18a and to insert the same within the casing 17, there is provided a reel 39 which is freely rotatable on the hollow shaft 40 which is driven by the belt 55 from the shaft 35. This shaft 40 carries a bracket member 41 having upstanding arms 41a, 41b, the arms 41b being provided with eyelets 42 for the passage of strand 18. The reel is slidable on shaft 40 and is resiliently mounted on a spring 31 which rests upon the bracket 41. The spring 31 permits a limited longitudinal movement of the reel during the reeling off operation whereby to relieve strain and prevent jerks on the strand 18. The coil 18a is formed by the strand 18 on a conical surface 43 of a fixed rod 44 which extends within the hollow shaft 40 and which is secured against rotation by a bracket 45. The formation of the coil 18a is caused by the rotation of the shaft 40 and bracket 41 about the fixed rod 44. The strand 18 is thus reeled off through the eyelets 42. Thus, it will be seen that the reel 39 does not traverse the race-circles, as do the bobbins 23, 23a, but is adapted for rotary movement only about the axis thereof in line with the braiding point 27.

As the strand 18 is fed onto the conical surface 43, a helical coil 18a is formed. The extended apex 43a (Figs. 13 and 18) of the conical surface 43 is positioned within the opening 28a of the forming plate 28 so that the tip thereof projects into the braided casing 17. The apex 43a is stationary and the formed coil 18a is gradually picked up by the yarns and the casing 17 at the braiding point. As shown in Figs. 11 and 13, the conical surface is stationary and forms a part of the apex 43a, but, as shown in Fig. 18, the conical surface 43 may be made separately and free to revolve on a projecting part 43b of the rod 44, the apex 43a being still held stationary. In the case, however, of feeding a wire coil, the apex 43a may be rotated by the machine and equipped with a grooved surface to regulate the feeding of the wire. The take-off rolls 30, 30a, 30b maintain a firm hold on the completed cord and thereby keep the braiding point 27 at the proper place so as to insure the proper insertion of the inner core.

In order to adjust the pressure exerted on the completed cord by the take-off rolls 30, 30a, 30b, there are provided, as shown in Fig. 16, adjusting screws 46 for positioning the plate 47 relative to a base plate 48. The plate carries a U-shaped bracket 49 which bears against the shaft 50 of the roll 30b and which is slidable in the slots 53 in the supporting members 54. The pressure thus applied to the roll 30b is transmitted by surface contact to the other rolls 30a and 30.

In order to prevent overrunning of the reel 39, there is provided a circumferential groove 39a at the bottom of the reel, which groove is adapted to receive two elastic members 56 which are secured to the arms 41a, 41b of the bracket 41 and tensioned so as to permit rotation of the reel when the strand 18 is being fed therefrom but which will maintain sufficient tension on the reel to prevent the overrunning thereof as the strand is wound upon the conical surface 43 by rotation of the bracket 41. This device may be made to feed two or more helics at the same time in parallel relationship.

Another method of feeding the core to the casing is shown in Fig. 17. In this device, the mechanism for forming the inner core may be removed and entirely separate from the braiding point. The yarns 17a, 17b may be formed into the braided casing 17 over the nozzle 57a of a conical skirted member 57. The nozzle 57a projects into the completed casing 17. The helical coil 18a, made according to Fig. 11, or any other form of inner core may be preformed and fed to the nozzle 57a by cooperating belt conveyors, or an equivalent device. The nozzle protects the coil from being squeezed at the braiding point and also causes the completed casing to narrow gradually to grip the inner core. The member 57 and its nozzle 57a may be employed either with or without a forming plate 28. Other forms of inner cores may be readily fed to the casing through the nozzle 57a, shown in Fig. 17. As for instance, a tucked core (Fig. 3a) may be fed to the casing 17 either by preforming the same or by employing a reciprocating stuffer blade or tamper to form the tucks. It is, of course, obvious that numerous other forms may be similarly inserted in the casing through the forming structure shown in Fig. 17.

If the inner core is preformed and then fed to the casing 17 of the cord, it is often necessary to provide means for insuring that the core will retain its condensed shape while being fed to the casing 17. This may be accomplished in many ways, such as forming silk core while wet and drying it in form, treating a formed core with quick-drying cement, or forming a helical core over a cotton center thread and inserting the entire core within the casing and then treating the cord with a dilute sulphuric acid solution which acts only on the cotton at the desired temperature and finally drying the cord to carbonize the cotton fibre, the ashes of which need not be removed. Traces of the sulphuric acid may be removed by employing a neutralizing agent of sodium carbonate or the like. Then, too, threads of short fibre lengths may be held together as a supporting center for the core by the use of suitable pastes or cement which are soluble, or which disintegrate upon contact with air. After the cord is formed and a solvent applied, the fine short fibers remain separated in the cord and will not interfere with playing out of the extensible core thread. In case a core is employed that is rigid and not subject to being crushed out of form by tension of the yarns, then the structure shown in Fig. 17 may be dispensed with.

The great flexibility of twisted rope is based on the following detail of construction. When rope is bent on a curve of short radius the elements along the inner edge are shortened considerably, and those along the outer edge are extended, for the reason that each strand connects from a point of compression to a point of extension in one half turn around the rope, and the strands are free to slip or chafe. In order to provide extensible wire cores that will flex freely with these conditions in rope, the wire is formed into a helical coil with the adjacent loops slightly separated to permit freedom of compression. The ridges of the twisted yarns of a fiber rope, or the wires, of a wire rope run practically parallel to the axis of the rope on the outer surface; at the center of the rope, however, they run transversely in substantially the form and angle of right handed thread grooves inside a thread cutting die. The loops of a right handed helical coil as described may be arranged to fit into these thread like crevices much as bolt threads fit into those of a nut. Thus the assembly is retained firmly in place throughout the several expansions and contractions to which the assembly is subject.

It is desirable for metallic or wire extensible cores in cordage to be resistant to change of form under lateral pressure, when the cordage is wound on hoist drums and the like under strain. This is accomplished as follows: The wire is formed into a helical coil of comparatively short radius. The resultant form, either solid or spaced, is substantially that of a small metal cylinder, or tube. Small thick walled metal tubes are exceedingly resistant to pressure.

From the foregoing description, it will be seen that a highly efficient safety bead cord is herewith provided but that the invention is not limited to such a cord inasmuch as rope, cable and other similar connecting lines may be made in accordance with the invention, that is, with a central core which is adapted to play out or elongate upon the rupture or parting of the outer covering, and thus prevent the complete parting of the ends of the connecting line. The invention further provides novel methods of making such connecting lines.

It is to be clearly understood that various changes in details of construction and in the methods of making the connecting line may be made without departing from the scope of the invention as set forth in the appended claims.

Having thus fully described the invention, what

I claim as new and desire to secure by Letters Patent, is:—

1. In a connecting device, an outer casing subject to tension and abrasion, and an inner folded member which is normally inactive but which is adapted to play out upon rupture of said casing whereby to prevent the complete parting of the connecting device.

2. In safety bead cord, an outer covering consisting of a plurality of interwoven strands, and an inner looped strand within said covering, said inner strand being adapted to play out upon rupture of the covering whereby to prevent parting of the bead cord.

3. In safety bead cord, an outer covering consisting of a plurality of interwoven strands subject to abrasion, and a normally inert inner folded strand within said covering, said inner strand being adapted to play out upon rupture of said covering to prevent complete parting of the bead cord.

4. The method of making safety cord which consists in forming an outer casing, forming an inner core on a retaining strand, inserting the inner core and the retaining strand within the casing and finally disintegrating the retaining strand.

5. In a connecting device, an outer casing including a plurality of twisted strands which are subject to tension and abrasion, and a coiled normally inactive core member within said casing, the coils of said coiled core member being adapted to fit between the strands on the inner surface of said casing, and said core member being adapted to elongate upon rupture of said casing whereby to prevent parting of the connecting device.

6. In a connecting device, an outer casing subject to tension and abrasion, a coiled member within said casing, a central strand within said coiled member, said coiled member being normally inactive but adapted to play out upon the rupture of said casing whereby to prevent parting of the connecting device, and said central strand being adapted to break as said coiled member plays out upon the rupture of said outer casing.

7. In safety bead cord for supporting beads, an outer covering consisting of a plurality of interwoven strands subject to abrasion and tension when the beads are supported thereon, and an inner strand of a length greater than that of the covering but inserted entirely within said covering, said inner strand being normally inactive and free from tension when the beads are supported by said outer covering but being adapted to play out upon the rupture of the outer covering whereby to cause a sag in the string of beads to warn the wearer and to prevent a complete parting of the bead cord.

8. In safety bead cord for supporting beads, an outer covering consisting of a plurality of interwoven strands subject to tension and abrasion when the beads are carried thereby, and a normally inert inner strand coiled in the form of a helix, said inner strand being free from tension when the beads are supported by said outer covering but being adapted to play out upon the rupture of said outer covering whereby to prevent the parting of the bead cord and the loss of the beads.

9. In a connecting device for assuming tensile loads, a main member which is subject to tension and adapted to assume the entire load when the device is loaded, and an auxiliary member which is entirely free from tension when the load is assumed by the main member, said auxiliary member being connected to said main member and being adapted to play out upon the rupture of said main member whereby to prevent complete parting of the connecting device.

10. In a connecting device for assuming tensile loads, an outer casing which is subject to tension and adapted to assume the entire load when the device is loaded, and an inner core member enclosed within said outer casing and being entirely free from tension when the load is assumed by the outer casing, said core member being of a greater extended length than said casing and having its ends connected to the ends of said casing and adapted to play out upon the rupture of said casing whereby to prevent complete parting of the connecting device.

11. In a connecting device for assuming tensile loads, an outer casing which is subject to tension and adapted to assume the entire load when the device is loaded, and a core member condensed within said outer casing and frictionally engaging the inner wall thereof and being entirely free of tension when the load is assumed by said outer casing, said core member being adapted to play out upon the rupture of said outer casing to prevent complete parting of the connecting device, the playing out of said core member being retarded by the frictional engagement thereof with the inner wall of said outer casing.

12. In a connecting device for assuming tensile loads, an outer casing which is subject to tension and adapted to assume the entire load when the device is loaded, and an inner coiled member disposed within said outer casing and being entirely free from tension when the load is assumed by the outer casing, said coil member having the ends thereof connected to the ends of said casing and being adapted to play out upon the rupture of said outer casing whereby to prevent a complete parting of the connecting device.

13. In a connecting device according to claim 10, wherein the inner core member is made of a buoyant material.

14. In a connecting device for assuming tensile loads, an outer casing which is subject to tension and adapted to assume the entire load when the device is loaded, an inner elastic core member which is entirely free from tension when the load is assumed by said outer casing, said casing and said core member having the ends thereof connected, and said core member being adapted to play out upon the rupture of said outer casing whereby to prevent complete parting of the connecting device.

15. In a connecting device for assuming tensile loads, an outer casing which is subject to tension and adapted to assume the entire load when the device is loaded, and an inner core member located and arranged within said outer casing in condensed form and connected to said casing at spaced points, said core member being entirely free from tension between the said spaced points when the load is assumed by the said outer casing and being free to extend and to assume tensile loads between said points when the outer casing is ruptured between the said points whereby to prevent complete parting of the connecting device.

STEPHEN P. F. SNEED.